United States Patent [19]

Ziller

[11] Patent Number: 4,710,294

[45] Date of Patent: Dec. 1, 1987

[54] ROTARY DISK FILTER ELEMENT

[75] Inventor: Josef Ziller, Waldstetten, Fed. Rep. of Germany

[73] Assignee: Schenk Filterbau Gesellschaft mit beschränkter Haftung, Waldstetten, Fed. Rep. of Germany

[21] Appl. No.: 801,009

[22] Filed: Nov. 22, 1985

[30] Foreign Application Priority Data

Nov. 24, 1984 [DE] Fed. Rep. of Germany ....... 3442870

[51] Int. Cl.$^4$ ............................................. B01D 33/26
[52] U.S. Cl. ................................... 210/232; 210/324; 210/331; 210/347; 210/486; 210/488
[58] Field of Search ............... 210/232, 325, 331, 332, 210/333.01, 356, 407, 409, 411, 412, 488, 492, 324, 334, 340, 345, 346, 486, 347

[56] References Cited

U.S. PATENT DOCUMENTS

| | | | |
|---|---|---|---|
| 1,699,680 | 1/1929 | Sweetland | 210/411 |
| 2,925,367 | 2/1960 | Soelberg | 210/411 |
| 2,946,447 | 7/1960 | Welz | 210/411 |
| 3,228,524 | 1/1966 | Richards | 210/411 |
| 3,471,026 | 10/1969 | Riker | 210/332 |
| 4,297,211 | 10/1981 | Hiesinger et al. | 210/411 |
| 4,592,838 | 6/1986 | Christophe et al. | 210/333.01 |

Primary Examiner—Richard V. Fisher
Assistant Examiner—Wanda L. Millard
Attorney, Agent, or Firm—Becker & Becker, Inc.

[57] ABSTRACT

A rotary disk filter element for a beverage filter for biological filtration. The filter element includes a closed base plate that is in the form of a ring-like member and on which is supported a filter fabric, with a support fabric being interposed between the base plate and the filter fabric. The filter fabric is secured to the base plate between an outwardly disposed retaining member and an inwardly disposed collar member. The collar member is provided with a supply opening for a wash fluid, especially a water/air mixture that is flushed through the filter fabric, counter to the direction of filtration, for removing filter residue for the general cleaning of the filter fabric. The filter fabric is secured to the base plate and to the support fabric at a plurality of point locations. This divides the free support or clamping lengths of the filter fabric into a number of relatively short regions that prevent the filter fabric from being overstretched and bulged during flushing. The formation of folds and damage to the filter fabric is thus prevented.

13 Claims, 4 Drawing Figures

ROTARY DISK FILTER ELEMENT

BACKGROUND OF THE INVENTION

1. Field of the Invention

The present invention relates to a rotary disk filter element for a liquid filter, especially a beverage filter for biological filtration, with depth effect.

2. Description of the Prior Art

With one known filter element of this general the (German Offenlegungsschrift No. 24 52 524—Ziller dated May 13, 1976 and belonging to the assignee of the present invention), only the radially inner and outer portions of a filter fabric are secured to the filter element by being clamped between collar regions of adjacent filter elements and a radially outer clamping or securing ring placed upon the outer edge of the filter element.

Rotary disk filter elements of this type are used as a filter unit in liquid filters for the filtration of beverages. When filtration has been terminated after a number of hours or even days, filter residue retained by filter fabrics is centrifuged-off the latter by rotating the filter elements. In order to flush the remainder of the impurities still sticking to the filter fabrics, water, along with air, is flushed as wash fluid through the filter fabric counter to the direction of filtration, with the filter element subsequently being rotated in order to remove the residues or impurities that are still present in the filter element. In so doing, the water/air mixture still present in a support fabric is pressed at increased velocity through the filter fabric in order to completely flush out the residue still sticking to the filter fabric. With this extremely effective flushing/cleaning process, the filter fabric is generally subjected to very great mechanical tensile and shearing stresses since the filter fabric is not supported against the base plate counter to the direction of filtration. Since the air added for the cleaning process impedes the discharge of the wash fluid, the filter fabric is raised between the clamping locations counter to the direction of filtration. When, after the filter elements have been flushed, the supply of water and air is terminated, the filter fabric remains raised since the air settles in the fabric passages, as a result of which the pressure below the filter fabric is maintained. During the subsequent acceleration of the filter elements via rotation, the water/air mixture that has accumulated below the filter fabric is pressed at increased velocity through the filter fabric, thus unduly stressing the filter fabric beyond the permissible stretching limit. As a consequence of centrifugal force, the water/air mixture is pressed into the radially outer edge region of the filter element. At this location the water/air mixture leaves the filter element, and the impurities are flushed out.

During the subsequent filtration, the over-stretched filter fabric lies upon the base plate or support fabric accompanied by the formation of wrinkles and folds, since due to its great width the filter fabric no longer has enough space on the base plate. These folds adversely affect the filtering process, since at some locations the surface of the filter fabric is inhomogeneous and uneven. During the subsequent flushing processes, the folds are drawn open due to the lifting force acting thereon, whereupon great bending stresses act upon the fabric in the folds. As a result of the constantly changing bending stresses that act upon the folds during flushing, fatigue failures occur, especially in the region of the corners of the folds. At that point the filter element becomes unusable, so that it must be replaced. This is very expensive, especially with large filter elements due to their high manufacturing and assembly costs. The cost is magnified even further because in order to replace filter elements the entire filter unit has to be disassembled, and annular seals disposed between adjacent filter elements have to be removed and replaced, for which purpose also the filter unit has to be disassembled.

The filter fabric can also be stressed and damaged during flushing by the fact that over a long period of time the filter fabric is not sufficiently cleaned, for example by an inadequate water flushing. As a result, residue of filtering aids accumulates in the passages of the filter fabric, so that these passages become narrower. During flushing, the entire pressure of the flushing water then builds up below the unsupported fabric, so that the latter is mechanically overloaded, which again leads to a permanent overstretching of the fabric and, due to the alternating stressing of the filter fabric during filtration and flushing, also leads to the formation of folds and the aforementioned drawbacks connected therewith.

Overstretching of the fabric can also occur if too great a quantity of water per unit area is used for flushing, or if the water pressure or mechanical dynamic stresses are too great during flushing.

Chemical filters are also known where the filter fabric or intermediate layer of a support fabric is secured by rivets directly and in a non-planar manner on a perforated plate. However, these chemical filters are not cleaned by flushing with a wash fluid; rather, to clean the filter element in the filtration device the filter element is sprayed with water at very high pressure. For this purpose, the water is sprayed at an angle onto the surface of the filter element, so that the residues are taken along and the water flows off from the same side of the filter element or filter fabric. In contrast to the aforementioned state of the art, the filter fabric cannot be raised from the perforated plate during cleaning, since it is actually pressed against the perforated plate by the water stream, and is supported by the plate. It is therefore not necessary to secure the filter fabric, because the high water stream pressure is effected at an angle to the fabric, whereby locally great shearing forces occur.

An object of the present invention is to design a rotary disk filter element of the aforementioned general type in such a way that formation of folds due to excessive stretching and bulging of the filter fabric counter to the direction of filtration during flushing is reliably prevented.

BRIEF DESCRIPTION OF THE DRAWINGS

This object, and other objects and advantages of the present invention, will appear more clearly from the following specification in conjunction with the schematic drawings, in which.

SUMMARY OF THE INVENTION

The filter element of the present invention comprises: a retaining member; a collar member having at least one supply opening for wash liquid; a closed base plate in the form of a ring-like member disposed between the retaining member and the collar member; a support fabric placed on the base plate; at least one filter fabric placed on the support fabric, with the filter fabric having a radially outer portion secured in the retaining member and a radially inner portion secured by the collar member, with the filter fabric communicating with the supply opening of the collar member so that filter residue can be removed from the filter fabric during general cleaning thereof by having the wash liquid flush through the filter fabric in the direction opposite to the direction of filtration; and securing means for securing the filter fabric to the base plate and the support fabric at a plurality of point locations.

As a consequence of the inventive design, the filter fabric is divided into a number of relatively small regions or zones that rest loosely upon the base plate or the support fabric. As a result, filter fabric regions having relatively short free support or securing lengths are formed; this is an extremely favorable situation, especially for large filter elements, because then during the flushing process only a slight bulging of the small regions is possible due to the wash fluid pressure that acts upon the filter fabric in a direction directed away from the base plate. As a result, only slight tensile stresses act upon these slightly bulged filter fabric regions, so that the stress on the filter fabric is reduced to a minimum during the flushing process. In this way, an overstretching of the filter fabric, and the formation of folds caused thereby, can be easily prevented, so that as a result the filtration process is not adversely affected, and the filter fabric can not break. The inventive filter elements therefore have a very long service life. Whereas up to now filter elements were viewed as parts subject to wear and hence expendable, the filter elements of the present invention can be viewed as a durable machine part that is not subjected to mechanical wear. As a result of the inventive way of securing the filter fabric, the filtration is surprisingly not adversely affected, since now as before a closed cake filter or filtering aid layer is deposited upon the entire filter fabric, in other words, even in the region of the securing means.

Further specific features of the present invention will be described subsequently.

DESCRIPTION OF PREFERRED EMBODIMENTS

Figure 1:
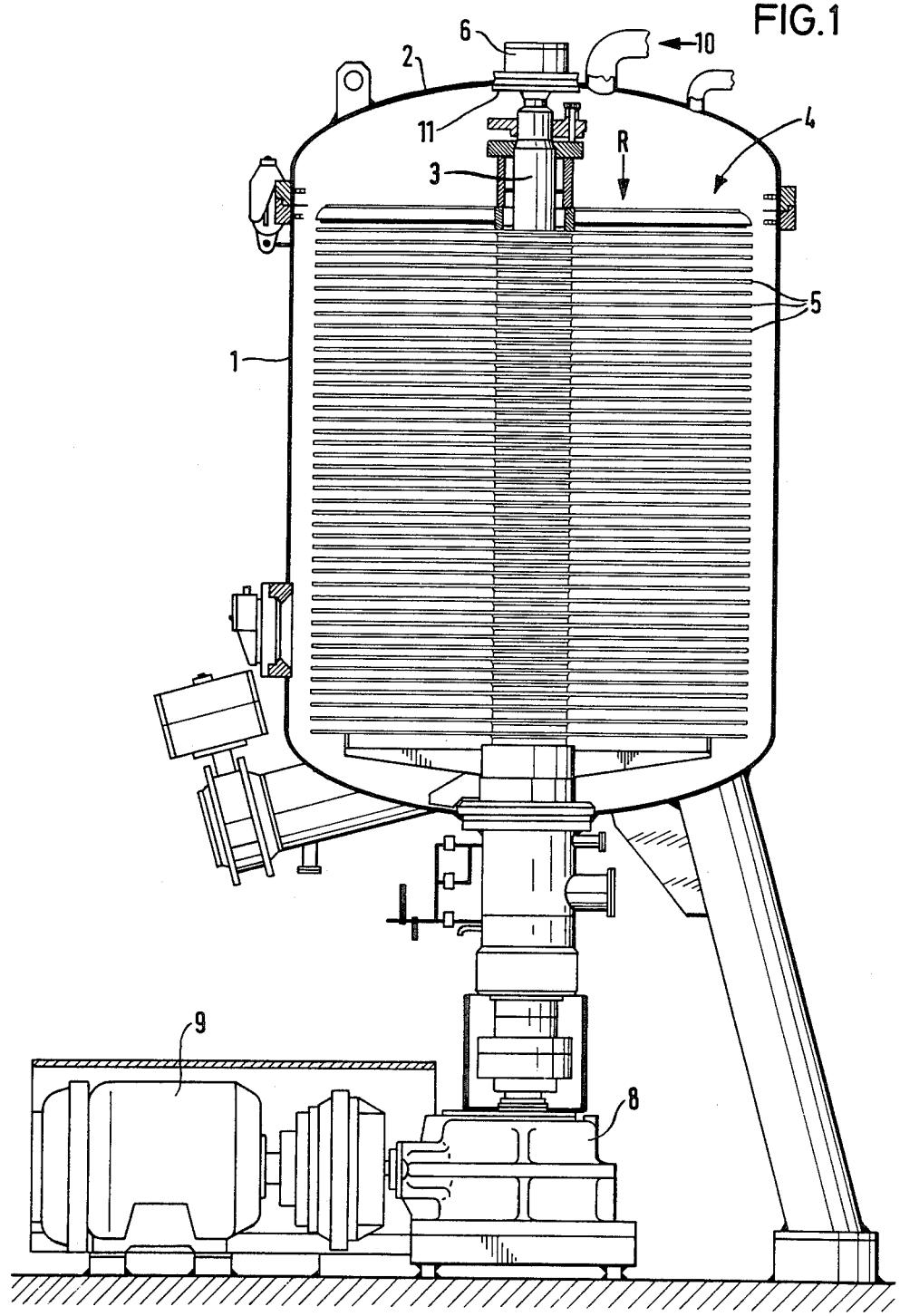
FIG. 1 shows a filter having a filter unit that comprises a plurality of inventive rotary disk filter elements disposed one above the other on a filtrate withdrawal shaft.

Referring now to the drawings in detail, FIG. 1 shows a filter for the biological filtration of liquids, especially beverages, such as, for example, beer. The filter has a container or housing 1 that can be closed off by a cover 2. Accommodated in the container 1 is a filter unit 4 composed of a plurality of rotary disk filter elements 5 that are disposed axially one above the other, and are secured to a vertical filtrate withdrawal shaft 3. The shaft 3 is disposed within the container 1, and the upper end of the shaft is rotatably mounted in a support 6 provided on the outer side of the cover 2. At the bottom, the filtrate withdrawal shaft 3 extends beyond the container 1 into a sealing and bearing housing 8. The gear mechanism accommodated in the housing 8 is associated with a motor 9 for rotating the shaft 3. The liquid that is to be filtered is introduced into the filter housing 1 via an inlet 10 and into a non-illustrated collecting chamber disposed between the cover 2 and a similarly not-illustrated distributing device mounted on a hub 11.

Each of the filter elements 5 of the filter unit 4 has the same construction. As shown in particular in FIG. 3, the filter elements 5 comprise a bottom or base plate 12 that is in the form of a ring-like member; a support mesh or fabric 14 is placed upon the base plate 12, and a filter fabric 13 is placed upon the support fabric 14, with both the fabrics 13 and 14 being secured to the base plate 12.

The base plate 12 is secured, preferably by being welded, to a collar 15 having a central bore 15a. The base plate 12, via the collar 15, is disposed on the filtrate withdrawal shaft 3. Further structural details of the filter elements 5 will be described subsequently in connection with FIG. 4, since the filter element 5 thereof, with the exception of its radial length and the use of further securing means for the filter fabric 13, has the same construction as do the filter elements 5 of FIGS. 1 and 3. Accordingly, the same parts have the same reference numerals.

Figure 4:
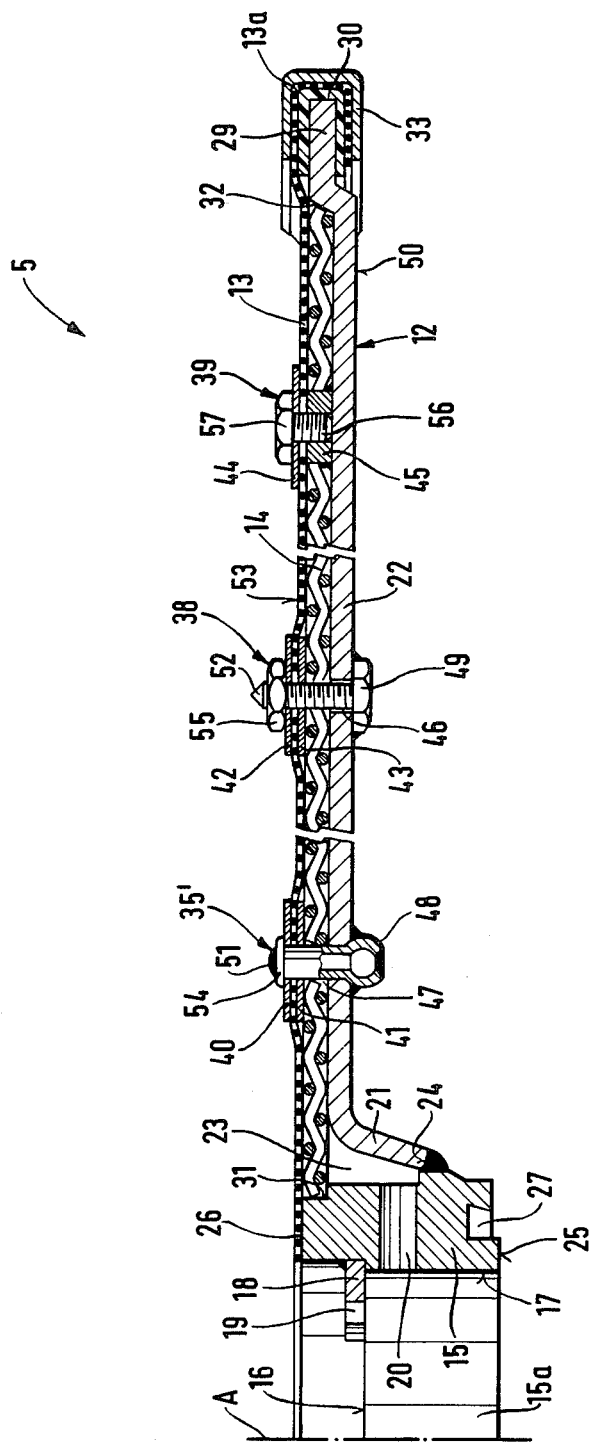
FIG. 4 shows a second embodiment of an inventive filter element illustrated in a radially shortened manner.
Figure 2:
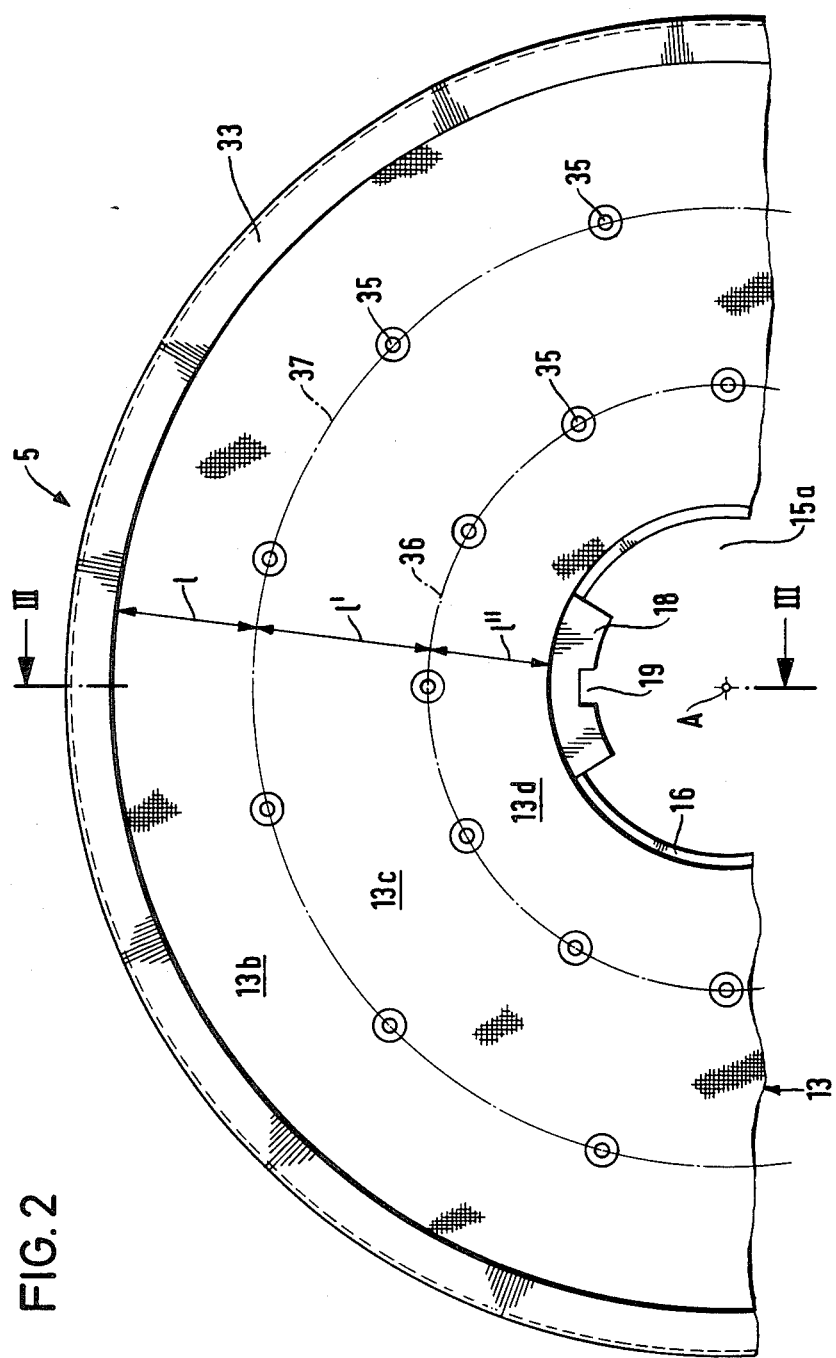
FIG. 2 is a plan view of the filter unit of FIG. 1 taken in the direction of the arrow II in FIG. 3.

As shown in FIGS. 2 and 4, to secure the base plate 12 on the filtrate withdrawal shaft 3, a retaining piece 18 is welded to a shoulder 16 of the inner wall 17 of the collar 15. The retaining piece 18, which extends into a pertaining, non-illustrated adjusting spring of the filtrate withdrawal shaft 3, has the shape of part of a circle, and is provided with a radially inner arresting opening 19. A plurality of transverse passages 20 are preferably uniformly distributed over the periphery of the collar 15. These passages open into the collar bore 15a, via which the filtrate is withdrawn and conveyed to an outlet of the container or housing 1.

The base plate 12 is welded to the collar 15 by means of an inner annular extension 21 that projects in a flange-like manner from the plane of the ring-like base plate 12. The extension 21 tapers conically in the direction toward the collar 15, with which it forms an angle of approximately 30°. When the base plate 12 is stamped, the annular extension 21 is formed by deep drawing.

The central annular zone 22, which forms the greatest part of the base plate 12, serves as the support for the large-meshed support fabric 14, on the outer surface of which, facing away from the annular extension 21, there rests the essentially fine-meshed filter fabric or fine cloth 13. The free edge 24 of the annular extension 21 is welded to the collar 15 in the region below the transverse passages 20, so that the collar 15 and the annular extension 21 together define an annular channel 23 via which the filtrate flows into the individual transverse passages 20.

Figure 3:
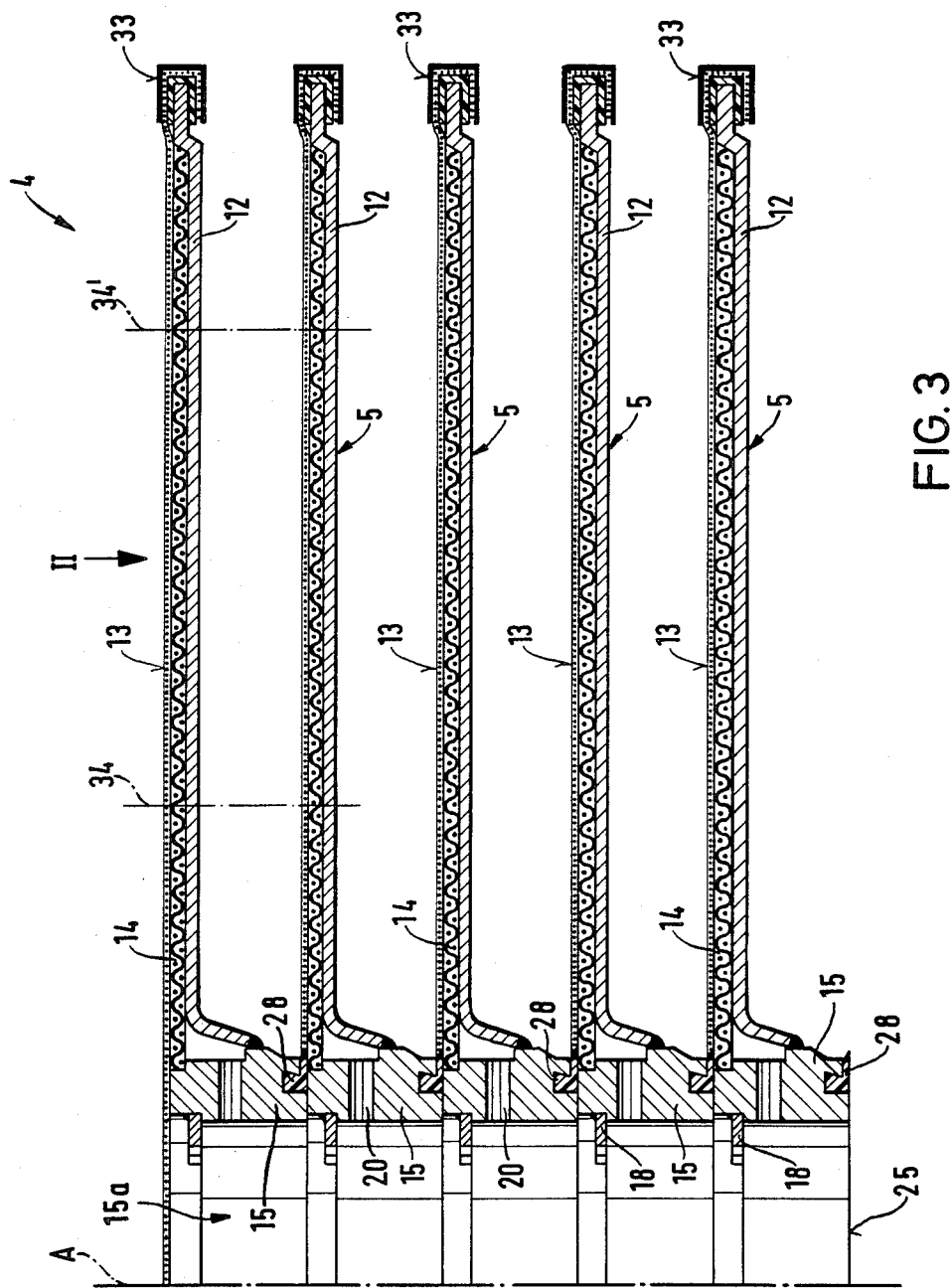
FIG. 3 is an axial section taken along the line III'III in FIG. 2.

As shown in particular in FIG. 3, the end faces 25, 26 (FIG. 4) of collars 15 that are disposed one above the other rest upon one another accompanied by the interposition of the associated filter fabric 13, thus preventing unfiltered liquid from flowing through between the collars in an unobstructed manner. Furthermore, to provide radial sealing of the filter fabrics 13, a groove 27 (FIG. 4) is provided in the lower end face 25 of the collar 15. Disposed in the groove 27 is a profiled ring 28 (FIG. 3) that is compressed when adjacent filter elements 5 are placed upon one another and are secured in position.

The base plate 12 is furthermore provided with a radially outer annular zone 29 (FIG. 4) that is offset in the direction opposite to that of the annular extension 21. The filter fabric 13 is looped or wrapped around this annular zone 29 accompanied by the interposition of a preferably resilient profiled seal member 30 that also extends around the outside of the annular zone 29. The profiled seal member 30 assures a good seal between the filter fabric 13 and the edges of the annular zone 29. The support fabric 14 extends only between an outer annular shoulder 31 of the collar 15 disposed above the retaining piece 18, and an opposed shoulder 32 formed between the offset annular zone 29 and the radially outer region of the central annular zone 22 (FIG. 4). The wrapped-around edge 13a of the filter fabric 13 is secured on the annular zone 29 of the base plate 12, i.e. on the seal member 30, by means of a retaining or clamping ring 33 that comprises a thin metal band and is placed over the annular zone 29. The ring 33 extends over the wrapped-around edge 13a of the filter fabric 13. During filtration, residues present in the liquid that is to be filtered are retained by the filter elements 5. In this connection, the residues are deposited on the filter elements 5, i.e. on the filter fabrics 13 thereof, as a coating. To clean the filter elements, the filtrate withdrawal shaft 3 is rotated by the motor 9 after filtration, whereby the filter elements 5 that are rigidly connected to the shaft 3 are also rotated. In so doing, the residues are centrifuged from the filter fabrics 13. In order to remove residue that is still stuck in the passage of the filter fabric 13, the filter elements are flushed with water accompanied by the supply of air, whereby this cleaning fluid or water/air mixture is conveyed through the filter elements 5 counter to the direction of filtration R. Since the air contained in the water impedes the discharge of water, a pressure builds up below the filter fabric 13, as a result of which the filter fabric is raised in the region between the clamping locations on the collars 15 and the securing ring 33. The filter elements 5 are subsequently rotated in order to press the water/air mixture through the filter fabric at greater speed. In order in this connection to avoid the filter fabric 13 being stretched beyond a permissible limit, the filter fabric is secured to the base plate 12 at a number of spaced apart locations 34, 34' (FIGS. 2 and 3). As illustrated in FIG. 2, blind or flush rivets 35 (not shown in greater detail) are preferably provided for this securement. The rivets 35 are preferably disposed in two spaced-apart circles 36 and 37 (FIG. 2) that are concentric to the axis of rotation A of the filter elements 5, i.e. of the filter unit 4.

As also shown in FIG. 2, the rivets 35 disposed on the circles 36 and 37 are offset relative to one another in the radial direction, so that a given rivet of the inner circle 36, when viewed in the radial direction, is disposed half way between two adjacent rivets of the outer circle 37. The inner and outer circles 36 and 37 are preferably spaced approximately the same radial distance from one another and from the inner and outer edge of the filter element, and hence from the securing locations 15 and 33 of the filter fabric 13 on the base plate 12. As a consequence of this securement scheme, a number of filter fabric region or zones 13b, 13c, and 13d having a relatively short free securing length 1, 1', and 1'' are formed. The fabric sections 13b, 13c, and 13d have approximately the same radial width.

Furthermore as a result of this securement scheme, the securing lengths 1, 1', 1'' of the zones 13b, 13c, and 13d of the filter fabric that can freely bulge during flushing under the existing liquid pressure between the securement location 35, 35', 38, 39 on the base plate 12 are relatively small compared to a filter fabric secured only between the collars 15 and the securing ring 33. As a result, there is reliably avoided an excess stretching and folding of the filter fabric 13, as well as an impairment of the filter action and damage to the filter fabric connected with such stretching and folding.

In place of the rivets, or in addition thereto, screws or bolts can also be used. At those spots where the rivets are located, the filter fabric could also be welded or soldered to the base plate.

In the filter element illustrated in FIG. 4, the securing means are disposed on three circles that are concentric to the axis of rotation A of the filter element. The securing means can either by in the form of rivets 35', or bolts or screws 38 or 39. For the purpose of simplification of illustration, in FIG. 4 these various securing means are illustrated on a single filter element.

As shown in FIG. 4, the base plate 12, the support fabric 14, and the filter fabric 13 are provided with aligned holes 46 and 47 so that the rivets 35' or the bolts 38 can be inserted therethrough; only the holes in the base plate and in the support fabric are shown. In order to prevent the edge region of the holes of the filter fabric 13 from tearing out, especially during flushing, washers or supporting disks 40, 42, 44 are provided at least on the outer side of the filter fabric 13. Preferably, however, a further washer or supporting disk 41, 43 is additionally disposed on the inner side of the filter fabric 13. The edge region of the pertaining hole of the filter fabric is clamped in a sandwich-like manner between the supporting disks 40, 41 or 42, 43.

The rivets 35' or bolts 38 are inserted into the pertaining holes 46, 47 from the underside of the base plate 12, so that the widened ends 48 of the rivets and the bolt heads 49 rest against the underside 50 of the base plate 12, whereas the shaft ends 51, 52 project upwardly beyond the surface 53 of the filter fabric. After fastening of the thus secured rivets, the rivet heads 54 rest against the outwardly disposed supporting disk 40. A nut 55 is threaded onto the end 52 of the bolt shaft; this nut 55 similarly rests against the outwardly disposed supporting disk 42.

In contrast to the bolts 38 or the rivets 35', the screws 39 are screwed into the filter elements 5 from the upper surface 53 of the filter fabric 13. The heads 57 of the screws rest against the supporting disk 44. When the screws 39 are used, no further supporting disk is provided between the filter fabric 13 and the support fabric 14. However, a threaded nut 45 into which the threaded shaft 56 of the screw 39 is screwed is provided in a pertaining opening of the support fabric. The threaded nut 45 is secured to the base plate 12, preferably by being welded thereto.

The rivets 35', or the bolts or screws 38, 39, are respectively disposed on inner, outer, and central circles that are concentric to the axis of rotation of the filter element 5. The radially inner and outer circles are preferably spaced the same distance from the clamping locations and from the central circle. With a particularly large filter element, however, the distance of the radially outer and inner circles from the central circle can be greater than the distance from the clamping locations, whereby nonetheless filter element regions or zones having relatively short free securing lengths are formed. However, it is also possible to provide large filter elements with further securing locations that are either likewise disposed on circles concentric to the axis of rotation A, or are provided at any other desired locations. This is done in order to further reduce the free securing lengths, so that the danger of damage to the filter fabric can be reliably prevented. As with the embodiment of FIGS. 1 to 3, the securing locations of the filter element 5 shown in FIG. 4 are preferably also disposed in a staggered relationship when viewed in the radial direction.

The present invention is, of course, in no way restricted to the specific disclosure of the specification and drawings, but also encompasses any modifications within the scope of the appended claims.

What is claimed is:

1. A rotary disk filter element for a liquid filter with depth effect; said filter element comprising:
   a retaining member;
   a collar member disposed inwardly of said retaining member and having at least one supply opening for wash liquid;
   a closed base plate in the form of a ring-like member disposed between said retaining member and said collar member;
   a support fabric placed on said base plate;
   at least one filter fabric placed on said support fabric on a side thereof remote from said base plate; said filter fabric having a radially outer portion secured to said base plate via said retaining member in a radially outer fastening zone; said filter fabric also having a radially inner portion secured by said collar member in a radially inner fastening zone, with said filter fabric communicating with said supply opening of said collar member so that filter residue can be removed from said filter fabric during general cleaning thereof by having said wash liquid flush through said filter fabric in a direction opposite to the direction of filtration; and
   securing means for securing said filter fabric to said support fabric and to said base plate at a plurality of point locations in a radial region between said radially inner fastening zone and said radially outer fastening zone particularly for avoidance of an over-expansion of said filter fabric during said flushing.

2. A filter element according to claim 1, in which said securing means are spaced from one another.

3. A filter element according to claim 2, in which said securing means are disposed on at least one circle, with each circle being concentric to the axis of rotation of said filter element.

4. A filter element according to claim 3, in which said securing means are disposed on two circles, namely an inner circle and an outer circle, with the securing means on said inner circle, when viewed in the radial direction of said filter element, being staggered relative to the securing means of said outer circle.

5. A filter element according to claim 3, in which said securing means are disposed on at least two circles, with the radially furthermost inwardly disposed securing means and the radially furthermost outwardly disposed securing means having the same radial spacing from the adjacent collar member and retaining member respectively.

6. A filter element according to claim 5, in which said securing means are disposed on at least two circles, with the radially furthermost inwardly disposed securing means and the radially furthermost outwardly disposed securing means having the same radial spacing from the adjacent collar member and retaining member respectively, and have approximately the same spacing from one another measured transverse to the peripheral direction of said filter element.

7. A filter element according to claim 3, in which said securing means are disposed on at least two circles, with securing means of adjacent circles having approximately the same spacing from one another measured transverse to the peripheral direction of said filter element.

8. A filter element according to claim 3, in which said securing means are disposed on at least two circles, with the distance between two adjacent securing means on a given circle, measured in the circumferential direction of that circle, being greater than the distance between two adjacent securing means on a radially further inwardly disposed circle.

9. A filter element according to claim 3, in which the same number of securing means are disposed on each of said circles.

10. A filter element according to claim 3, in which said securing means are in the form of at least one of the group consisting of rivets, bolts, and screws.

11. A filter element according to claim 3, in which said securing means are supported against said filter fabric under the interposition of supporting disk means disposed on at least one side of said filter fabric.

12. A filter element according to claim 11, in which at least some of said securing means are in the form of bolts and screws; and which includes nut means for keeping said bolts and screws from loosening.

13. A filter element according to claim 12, in which, for those securing means in the form of screws, said nut means are secured to said base plate, extend through said support fabric, and rest against that side of said filter fabric that faces said support fabric.

* * * * *